Figure 1:
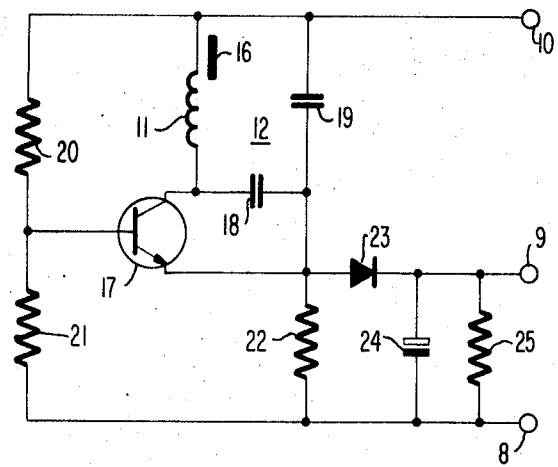

United States Patent [19]

Gumtau et al.

[11] 3,735,244
[45] May 22, 1973

[54] DISPLACEMENT PICK-UP

[75] Inventors: Hanns Dieter Gumtau, Neustadt; Rainer Kowarsch, Aldingen, both of Germany

[73] Assignee: Daimler-Benz Aktiengesellschaft, Stuttgart-Unterturkheim, Germany

[22] Filed: Sept. 17, 1971

[21] Appl. No.: 181,464

[30] Foreign Application Priority Data

Sept. 19, 1970 Germany..................P 20 46 336.9

[52] U.S. Cl..................323/51, 317/99, 324/34 D, 331/65
[51] Int. Cl. ..............................................G01r 33/00
[58] Field of Search ..................331/65, 181; 317/99; 325/111, 118; 324/34 D; 340/197; 336/136; 323/57, 62, 51, 90

[56] References Cited

UNITED STATES PATENTS

| 3,609,580 | 9/1971 | Thompson et al. | 331/65 |
| 3,474,332 | 10/1969 | Brown | 331/65 |
| 3,621,307 | 11/1971 | Raven et al. | 331/65 |
| 3,646,541 | 2/1972 | Rathbun | 331/65 |

*Primary Examiner*—Gerald Goldberg
*Attorney*—Craig, Antonelli and Hill

[57] ABSTRACT

An electronic motion pick-up in which a core made of ferromagnetic material and displaceable in accordance with the motion to be measured, is adapted to be immersed into a coil forming part of a tuned circuit of a transistorized oscillator whose rectified output voltage is used as electrical measuring magnitude; the permeability of the core is thereby limited to such a value that the oscillations are not stopped also with the deepest immersion of the coil into the core which is possible during the operation.

22 Claims, 3 Drawing Figures

Patented May 22, 1973

3,735,244

INVENTORS
HANS DIETER GUMTAU
RAINER KOWARSCH

BY Craig, Antonelli & Hill
ATTORNEYS

DISPLACEMENT PICK-UP

The present invention relates to an electronic motion pick-up or displacement transmitter in which a core of ferromagnetic material which is displaceable within a coil in accordance with the displacement to be measured, influences the amplitude of the electrical output signal of an electric circuit.

Numerous displacement pick-ups are known in the prior art in which a magnetic core displaceable in one or several coils, which is acted upon by the displacement to be measured, influences the electrical output signal of an electric circuit connected to the inductance. The disadvantage of the known apparatus, however, resides in that they require special voltage sources, require a large amount of space and frequently are not able to withstand the requirements in rough, practical operation.

The aim of the present invention essentially consists in providing an electronic motion pick-up or displacement transmitter of the aforementioned type which can be fed with those D.C. voltages of slight magnitude as are available everywhere, which also supplies a D.C. voltage as output magnitude that can be readily processed, and which nonetheless has slight space requirements as well as continues to operate reliably also in rough, practical operation and exhibits a long length of life.

As a solution to the underlying problems, the present invention provides that the coil is a part of the tuned circuit of a transistor oscillator whose rectified output voltage is utilized as an electrical measuring magnitude, whereby the permeability of the core is limited to such a value that the oscillations do not break-off or stop also in case of the deepest immersion of the core into the coil which is possible during the operation. Consequently, according to the present invention the damping of the tuned circuit changed by the immersion of the magnetic core into the coil is utilized for the measurement. Advantageously, the transistorized oscillator may be operated with quite small D.C. voltages of the order of magnitude of 10 V., which, for example, are available as such in vehicles, but which could also be made available and readied with slight expenditures at other locations by utilizing commercially available batteries which are sold everywhere. Also the output signal of the pick-up is available as a D.C. voltage with values between about 3 V. and 9 V. so that control and regulating apparatus can be connected directly to the output of the motion pick-up according to the present invention, i.e., without transformation or amplification of the output magnitude.

Advantageously, a conventional capacitive Colpits three-point-oscillator is used which can be accommodated in the smallest space, utilizes only a single non-tapped coil and operates always reliably also with strongly fluctuating temperatures.

A particularly space-saving construction is achieved if the remaining electronic structural elements are arranged about the coil. The coil is thereby secured in an upright position, preferably centrally, on a dielectric printed circuit plate of circular disk shape and provided with electrical connections, onto which the electronic structural elements are soldered in an upright position essentially parallel to the coil axis.

At the opposite end of the coil is disposed a preferably circular disk of the same diameter as the printed circuit plate whereby the entire arrangement is inserted into a cylindrical housing corresponding to the disk diameter.

In order to exclude spurious, disturbing influences from the outside the housing preferably consists of ferromagnetic material.

A good measuring accuracy connected with simple manufacture is achieved if the circular disk is made in one piece with the coil body.

In order to far-reachingly eliminate external influences and to fix the position of the individual electronic elements, the interior space of the housing is filled out preferably with a non-conducting molded material.

The entire arrangement is inserted into the housing preferably with the circular disk at its head in such a manner that the printed circuit plate is disposed toward the open end of the housing. The circuit plate is thereby arranged preferably recessed in the housing whereby the housing opening is closed by a cover of ferromagnetic material and provided with means for the lead-in wires, for example, in the form of an insulator bush or the like. All magnetic distrubing influences from the cover side are thereby excluded by these measures.

The arrangement according to the present invention is so insensitive against lateral displacement of the core on the inside of the coil interior space that the core has to be guided from the outside only axially but not laterally. The motion pick-up according to the present invention is thus particularly suitable for the rough operation in motor vehicles and requires no precision manufacture.

In applications in which oil might enter into the coil body along the magnetic core, it is provided according to the present invention that the coil body rests tightly on the circuit plate. The penetration of the oil into the electronic circuit is thereby effectively prevented.

In applications in which the displacement pick-up is to produce a very low constant output signal within a predetermined displacement, the present invention provides that the coil body with laterally extending lead-in wires extends through the cover. By the use of such an arrangement, the core can thus extend through the cover, i.e., it is longer than the coil of the tuned cirucit. As long as the core completely fills the interior space of the coil, the lowest possible D.C. voltage is produced constantly. Only when the core is partially pulled out of the coil interior space, the output signal increases.

In order to be able to readily fasten the motion pick-up according to the present invention, the end of the housing opposite the cover through which the core extends, is provided with a thread for the threaded connection to a fixed part.

The motion pick-up according to the present invention consists of few relatively inexpensive structural parts, can be manufactured at low cost and is extraordinarily robust. The diameter as well as the material of the coil have no significant influence on the output voltage. The core may even be constructed hollow.

The arrangement is insensitive against vibrations and magnetic disturbance fields. The temperature sensitivity is slight.

The main advantage of the displacement pick-up of the present invention resides in that the adjusting force for the core is very small, parts prone to wear do not exist and a long length of life is assured. Also, the linearity of the dependency of the output voltage from the input magnitude is very good.

Accordingly, it is an object of the present invention to provide an electronic motion pick-up which obviates by simple means the aforementioned shortcomings and drawbacks encountered in the prior art.

Another object of the present invention resides in an electronic displacement pick-up which is extraordinarily robust and capable to withstand rough, practical operating conditions as may occur, for example, in motor vehicles.

A further object of the present invention resides in an electronic displacement pick-up which requires relatively little space, can be operated with normally available D.C. power supplies and exhibits a long length of life.

Still a further object of the present invention resides in an electronic displacement pick-up of the type described above which utilizes few, simple electronic elements arranged in a space saving manner within a housing accommodating also the coil, which effectively shields the pick-up against external magnetic influences.

Another object of the present invention resides in a displacement pick-up of the type described above in which the penetration of oil into the electronic circuit is avoided, no parts are used that are prone to wear and a good linearity is assured between input and output signals.

Figure 2:
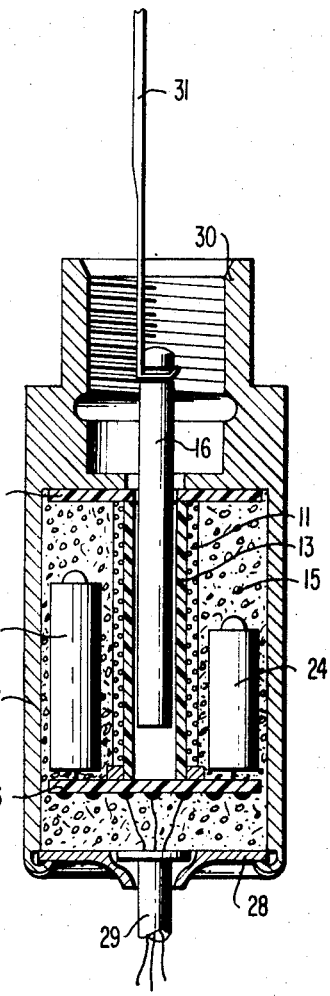
Figure 3:
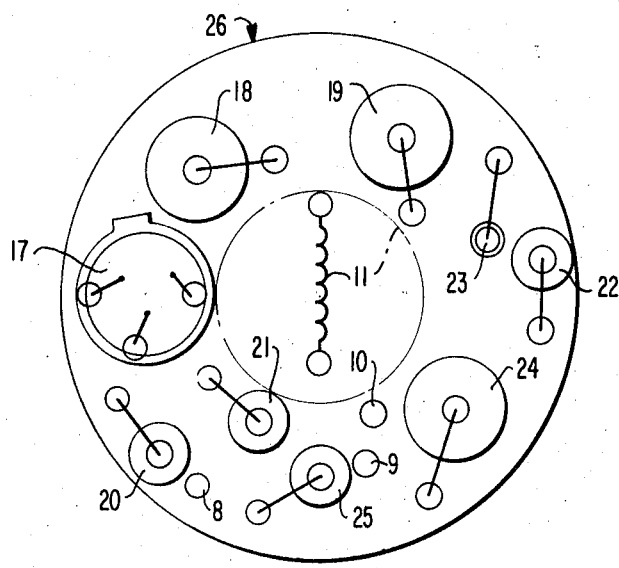

These and further objects, features and advantages of the present invention will become more apparent from the following description when taken in connection with the accompanying drawing which shows, for purposes of illustration only, one embodiment in accordance with the present invention, and wherein:

FIG. 1 is a schematic electric circuit diagram of a motion pick-up of the present invention utilizing a capacitive Colpits three-point-oscillator, FIG. 2 is an axial cross-sectional view through the motion pick-up according to the present invention, and FIG. 3 is a schematic plan view on the printed circuit plate used with the pick-up of FIG. 2.

Referring now to the drawing wherein like reference numerals are used throughout the various views to designate like parts, and more particularly to FIG. 1, the conventional Colpits oscillator shown in this figure includes a transistor 17, tuned-circuit condensers 18, 19, a voltage divider 20, 21, a discharge resistance 22 a diode 23 as well as a filter condenser 24 and a resistance 25 connected in parallel thereto. The voltage produced by the oscillator is rectified and filtered in the rectifier arrangement consisting of the diode 23, the condenser 24 and the resistance 25, the latter two elements constituting a filtering network.

The D.C. supply voltage for the oscillator is connected to the input terminals 8 and 10; the rectified output voltage is picked-up at the output terminals 8 and 9.

In addition to the condensers 18 and 19 the tuned circuit 12 of the oscillator includes the oscillator coil 11, which is an air coil and in which is arranged a core 16 (FIG. 2) displaceable corresponding to the displacement or distance to be measured. The core 16 consists of soft magnetic material and is cylindrically shaped.

The core 16 immersing into the field of the coil 11 removes energy from the tuned circuit 12 whereby a change in amplitude of the oscillations is associated therewith. This change is utilized for the measurement.

With an optimum design of the coil 11 and a favorably selected oscillator frequency, the frequency change is smaller than 10 percent whereas the amplitude change can amount to 70 percent during the immersion of the core 16.

The selection of the elements is preferably so that the output voltage at the terminals 8 and 9 lies between about 25 and 80 percent of the supply voltage at the terminals 8 and 10 and has a ripple voltage of about 5 percent.

The change of the output voltage with temperature changes is limited in the embodiment according to FIG. 1 to about 5 mV per °C due to the high base voltage divider current, and the large negative feedback. It may be changed by another realization of the output voltage. The rise and the linearity of the characteristics can be changed for special applications by the core material, core shape and winding characteristics.

FIGS. 2 and 3 illustrate a particularly spatially favorable construction of the motion pick-up according to the present invention.

According to FIG. 2 the oscillator coil 11 is wound on a coil body 13 consisting of insulating material which is placed at the bottom thereof in FIG. 2 tightly on a printed circuit plate 26 which carries at its bottom side the conductive paths necessary for the electrical connections. According to the present invention, the printed circuit plate 26 is constructed circularly shaped. The coil body 13 is arranged centrally whereas the electronic and circuit elements 17 to 25 are mounted about the coil 11 on the printed circuit plate 26. The connections of the elements 17–25 extend through bores in the circuit plate 26 and are soldered in the usual manner to the conductive paths.

At the end opposite the printed circuit plate 26 the coil body 13 includes a circular disk 14 which has the same diameter as the circuit plate 26. The entire arrangement is inserted into an essentially cylindrical housing 27 whose inner diameter corresponds to that of the disk 14 and of the plate 26. The housing 27 consists of magnetic material for the purposes of shielding.

The depth of the housing is slightly larger than the distance of the disk 14 from the plate 26 so that a cover 28 can be installed over the lower opening of the housing 27 which also consists of magnetic material. In the center the cover 28 includes a lead-in wire means 29 of any conventional construction, for example, in the form of an insulator bush or the like.

For fixing all structural elements and for the protection against external influences, the entire interior space of the housing 27 is filled with a non-conductive molded mass 15.

At the end opposite the cover 28, the housing 27 is provided with an internal thread 30 which serves for the threaded connection at a fixed part, for example, on the inside of a vehicle.

The core 16 made from magnetic material which is actuated with the displacement to be measured, extends into the interior of the coil body 13. It is connected by way of a suitable connecting rod 31 with that part whose displacement is to be converted into a corresponding electric D.C. voltage.

The cover 28 can be secured in a simple manner by flanging over or pressing in the housing edge.

While we have shown and described only one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What we claim is:

1. An electronic displacement pick-up in which a core of ferromagnetic material displaceable in a coil means corresponding to the displacement to be measured, influences the amplitude of the electric output signal of an electric circuit means, characterized in that the electric circuit means includes a transistor oscillator means having a tuned circuit means and output means having rectifier means for rectifying the electrical oscillations of the oscillator means, said coil means being a part of said tuned circuit means and the rectified output voltage appearing in the output means serving as an electrical measuring magnitude, and in which the permeability of the core is limited to such a value that the oscillations are not interrupted with the deepest immersion of the core into the coil means, which is possible during the operation, said electric circuit means including electronic and circuit elements arranged about said coil means, said coil means being secured in an upright position on a printed circuit plate provided with electric connecting means, the electronic and circuit elements being soldered onto the circuit plate in a substantially upright position and substantially parallel to the coil axis.

2. A displacement pick-up according to claim 1, characterized in that a disk of substantially the same configuration as the printed circuit plate is provided at the opposite end of the coil means, and the entire arrangement is inserted into a cylindrical housing.

3. A displacement pick-up according to claim 2, characterized in that the housing consists of ferromagnetic material.

4. A displacement pick-up according to claim 2, characterized in that said circuit plate and said disk are of circular shape with substantially the same diameter, and in that said housing has an internal configuration corresponding to said circular shape.

5. A displacement pick-up according to claim 4, characterized in that the circular disk is made in one piece with a coil body.

6. A displacement pick-up according to claim 5, characterized in that the interior space of the housing is filled with a non-conductive material.

7. A displacement pick-up according to claim 6, characterized in that said non-conductive material is a molded material.

8. A displacement pick-up according to claim 6, characterized in that the arrangement is inserted into the housing with the disk at its head in such a manner that the printed circuit plate is disposed toward the open end of the housing.

9. A displacement pick-up according to claim 8, characterized in that the circuit plate is arranged recessed within the housing and that the housing opening is closed off by a cover of ferromagnetic material provided with wire lead-in means.

10. A displacement pick-up according to claim 6, characterized in that the core is guided from the outside only axially but not laterally.

11. A displacement pick-up according to claim 10, characterized in that the coil body rests tightly on the circuit plate.

12. A displacement pick-up according to claim 8, characterized in that the coil body with laterally extending lead-in wires extends through a cover provided at the open end of the housing on the outside of the printed circuit plate.

13. A displacement pick-up according to claim 8, characterized in that the end of the housing opposite the cover through which extends the core is provided with a thread for the threaded connection to a fixed part.

14. A displacement pick-up according to claim 13, characterized in that said oscillator circuit means is a capacitive Colpits-oscillator.

15. A displacement pick-up according to claim 2, characterized in that the interior space of the housing is filled with a non-conductive material.

16. A displacement pick-up according to claim 15, characterized in that said non-conductive material is a molded material.

17. A displacement pick-up according to claim 2, characterized in that the arrangement is inserted into the housing with the disk at its head in such a manner that the printed circuit plate is disposed toward the open end of the housing.

18. A displacement pick-up according to claim 2, characterized in that the circuit plate is arranged recessed within the housing and that the housing opening is closed off by a cover of ferromagnetic material provided with wire lead-in means.

19. A displacement pick-up according to claim 1, characterized in that the core is guided from the outside only axially but not laterally.

20. A displacement pick-up according to claim 1, characterized in that a coil body rests tightly on the circuit plate.

21. A displacement pick-up according to claim 20, characterized in that the coil body with laterally extending lead-in wires extends through a cover provided at the open end of the housing on the outside of the printed circuit plate.

22. A displacement pick-up according to claim 21, characterized in that the end of the housing opposite the cover through which extends the core is provided with a thread for the threaded connection to a fixed part.

* * * * *